No. 669,708. Patented Mar. 12, 1901.
C. E. SCRIBNER.
APPARATUS FOR TELEPHONE SWITCHBOARDS.
(Application filed Feb. 28, 1895.)
(No Model.)
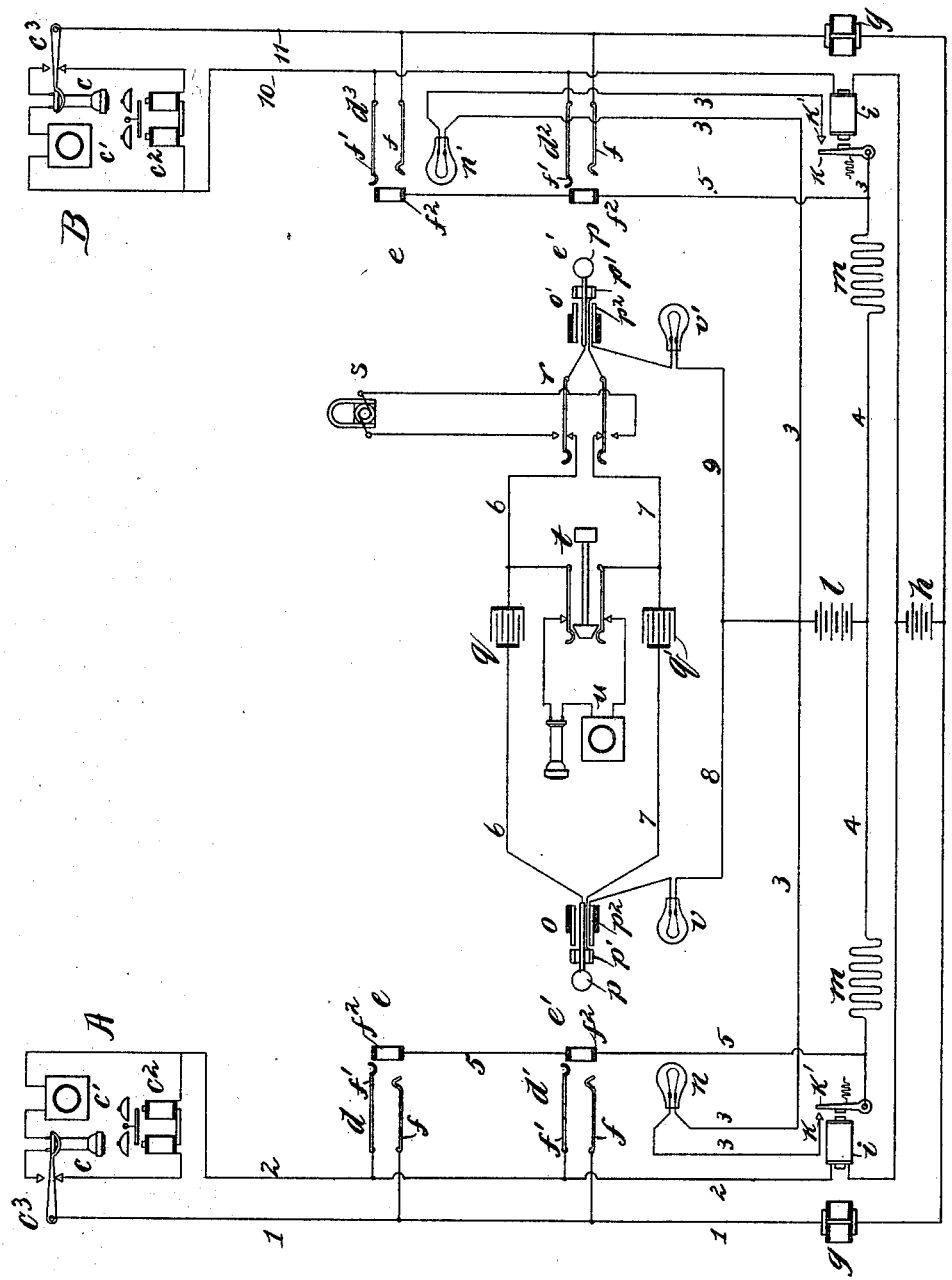

UNITED STATES PATENT OFFICE.

CHARLES E. SCRIBNER, OF CHICAGO, ILLINOIS, ASSIGNOR TO WESTERN ELECTRIC COMPANY, OF SAME PLACE.

APPARATUS FOR TELEPHONE-SWITCHBOARDS.

SPECIFICATION forming part of Letters Patent No. 669,708, dated March 12, 1901.

Application filed February 28, 1895. Serial No. 540,067. (No model.)

*To all whom it may concern:*

Be it known that I, CHARLES E. SCRIBNER, a citizen of the United States, residing at Chicago, in the county of Cook and State of Illinois, have invented a certain new and useful Improvement in Apparatus for Telphone-Switchboards, (Case No. 378,) of which the following is a full, clear, concise, and exact description, reference being had to the accompanying drawings, forming a part of this specification.

My invention relates to the signaling and testing appliances of telephone-switchboards.

It comprises two coöperative features which concern, respectively, the transmission of signals from the substation of a telephone-line to the telephone-switchboard and the indication of the free or "busy" condition of a line to an operator making connection with it. The objects of the first-mentioned feature are to effect the transmission of the signals for connection and disconnection at the telephone-switchboard automatically in the use of the substation apparatus and to efface the call-signal and substitute for this signaling instrument a different signaling device adapted to respond to the signal for disconnection. The object of the second feature is to indicate automatically to an operator establishing connection with a line at any section of the switchboard whether the line be free for use or not, in order that she may not interfere with a connection already existing.

My invention involves the use of annunciators or signals which are adapted to be operated or excited by a predetermined normal current, but to remain inert when traversed by a current materially less—as, for example, by half of the normal current. In practice incandescent lamps are found to be suitable signals of this type, being illuminated by a suitable current, but remaining unlighted when traversed by half of this current.

My invention consists in arranging two such signals in parallel branches of a local circuit and in controlling the continuity of one of the branches by a relay responding to currents in the telephone-line. The signal in the branch controlled by the relay is designed to act as an individual signal and is permanently associated with a particular line. The other signal may be associated with one of the plug-circuits provided for uniting different telephone-lines, and the branch including it may be normally open, terminating in a contact-piece in the connecting-plug adapted to complete the branch while the plug is in use in a spring-jack.

In the normal condition of the apparatus at the switchboard the individual signal is free to respond to currents in the corresponding line-circuit caused by the completion or interruption of the line-circuit at the substation, and thus by its display may indicate an initial or call signal from the substation. When, however, in response to such a signal connection has been made with the line, the other of the two branches is closed through the clearing-out or disconnection signal, whereby the indication of the individual signal is effaced, the clearing-out signal remaining inert. The signals remain in this condition until the relay, responding to an altered condition of the line-circuit, opens the branch including the individual signal, whereby the clearing-out signal is excited.

In a suitable form of my invention the substation of each telephone-line is provided with a switch, preferably an automatic telephone-switch, by which the normally high-resistance or open-line circuit may be closed during the use of the telephone at the substation, and in the switchboard at the central station a relay and a source of current are included in the line-circuit, the contact-points of the relay being adapted when the relay is excited to complete the branch of the before-mentioned local circuit which includes the individual signal corresponding to the line. The interrupted portions of the other branch of the local circuit terminate, respectively, in a contact-piece in each of the spring-jacks of the line, and in a corresponding contact-piece upon the connecting-plug which is designed to be inserted in the spring-jack to establish connection with the line. The source of current in the local circuit is common to the different pairs of plugs in the switchboard, and these are therefore interchangeable with respect to their use in different spring-jacks. Hence any plug may be used in connection with any spring-jack without interfering with the operation of the associated clearing-out signal. In a switchboard system thus organized the removal of the telephone from the switch-hook at a substation causes the excitement of the relay in that line at the central station and thus operates or excites the corresponding individual signal in the switchboard. The operator thereupon inserts a plug into the spring-jack, effacing the indication of the individual signal. The clearing-out signal still remains inert, since the current in the local circuit is divided between the two signals. When, however, the telephone at the substation is replaced upon its switch-hook, the circuit of the line is interrupted, the relay is no longer excited, and it interrupts the branch of the local circuit including the individual signal, thus diverting the full current through the clearing-out signal and causing the latter signal to be displayed.

If a connecting-plug be inserted in a line which is free—that is, which is not already in use—the clearing-out signal remains excited until the substation-telephone is brought into use, since the circuit through the individual signal of the corresponding line is interrupted until that time; but if a plug be inserted into a spring-jack of a line whose telephone is already in use or with which a connection already exists, either one or two branches of the local circuit will have been already completed, so that the clearing-out signal of the plug last inserted into a spring-jack of the line will remain inert. The condition of the clearing-out signal therefore constitutes a "test" which signifies the free or busy condition of the line with which connection is made. In a multiple switchboard the test thus becomes automatic and is indicated by a suitable visible signal.

The accompanying drawing represents diagrammatically the disposition of the apparatus of my invention.

In the drawing two substations A and B are shown, each connected, through line conductors, with spring-jacks upon different sections of a multiple switchboard and with a relay controlling an individual signal. The apparatus at the substations comprises a receiving-telephone $c$ and a transmitting-telephone $c'$, a signal-bell $c^2$, and an automatic switch $c^3$, arranged to close the line-circuit alternately through the telephonic and signaling appliances.

The apparatus of substation A is connected by line conductors 1 and 2 with two spring-jacks $d$ and $d'$ upon different sections $e$ and $e'$ of a multiple switchboard at the central station, the different line conductors terminating in different line-contacts $f$ and $f'$, respectively, in each of the spring-jacks. The conductor 1 of the line is extended, through an impedance-coil $g$, to one pole of a battery $h$, while conductor 2 is connected with the other pole of battery $h$, a line-relay $i$ being included in the conductor. The battery $h$ and relay $i$ are so adjusted to the resistance in the line-circuit that when the circuit is closed through the bell $c^2$, which should be of high resistance, the relay is not appreciably excited, while when the circuit is closed at the substation through the telephone the relay shall attract its armature.

The contact-points $k$ $k'$ of relay $i$ are included in a branch 3 of the local circuit 3 4 of a battery $l$, a resistance-coil $m$ being connected in the local circuit. The branch 3 includes also the individual signal-lamp $n$, which is associated with the spring-jack $d'$ in the switchboard. Each spring-jack is provided with a contact-ring $f^2$, the different contact-rings being connected together through a wire 5, which is connected with the conductor 4 of the local circuit.

Connecting-plugs $o$ and $o'$ are provided for looping different telephone-lines together by means of their spring-jacks. Each plug contains two contact-pieces $p$ and $p'$, which are adapted to make connection with the line-contacts $f$ and $f'$ of the spring-jack, and another contact-piece $p^2$, which is arranged to connect with the ring $f^2$ of the spring-jack. The contact-pieces $p$ of the two plugs are connected together through a conductor 6 and the pieces $p'$ by another conductor 7. Each of these conductors includes a condenser, the condensers being designated $q$ and $q'$, respectively. The conductors 6 and 7 extend through the switch-contacts of a calling-key $r$, by means of which a generator $s$ of signaling-current may be looped into connection with the plug $o'$, and branches from them are led to the switch-springs of a listening-key $t$ for connecting the operator's telephone $u$ with the plug-circuit.

The contact-piece $p^2$ of plug $o$ constitutes the terminal of a conductor 8, including the clearing-out signal-lamp $v$, which is associated with that plug. Contact-piece $p^2$ of plug $o'$ similarly constitutes the terminal of another conductor 9, including lamp-signal $v'$, associated with plug $o'$. Conductors 8 and 9 extend directly to the local battery $l$.

The drawing represents the apparatus in its normal or idle position. The telephones at the substations rest upon their switch-hooks, so that the line-circuits are closed only through the high-resistance signal-bells $c^2$. The relays $i$ are therefore not excited and the individual signal-lamps remain unlighted.

Assume, to illustrate the operation of the system, that subscriber at station A wishes to communicate with subscriber at station B. He removes his telephone-receiver $c$ from its switch-hook. Current then finds circuit from battery $h$ through relay $i$ and the telephone at the substation. The relay draws its armature forward, thus closing the branch circuit 3 and illuminating signal-lamp $n$. The operator perceives this signal and inserts plug $o$ into the corresponding spring-jack $d'$, at the same time connecting her telephone set $u$ with the plug-circuit 6 7 by means of listening-key $t$. The operator is thus placed in telephonic communication with the subscriber at station A, the circuit being through line conductors 1 and 2, contacts $f f'$ of the spring-jack, and portions of the conductors 6 and 7 of the plug-circuit. She is thus in position to learn his order for the connection required. By the insertion of the plug into the spring-jack the contact-piece $p^2$ is brought into connection with the contact-ring $f^2$ of the spring-jack, thus closing together conductor 5, terminating in the spring-jack, and conductor 8, terminating in the plug, and completing the circuit through the signal $v$. The two conductors 3 and 5 8, including the individual signal $n$ and the clearing-out signal $v$, respectively, are thus brought into parallel connection with each other in the local circuit, including conductor 4 and resistance-coil $m$. The current through the resistance-coil, which is sufficient to light a signal-lamp, is now distributed to the two lamps, so that neither of these is illuminated—that is, when the plug is inserted into the spring-jack the individual signal is extinguished, while the clearing-out signal remains still unlighted. When the operator has learned the order of subscriber at station A, she inserts plug $o'$ into the spring-jack $d^2$ of line to station B. The branch 9, terminating in plug $o'$, is now closed to the conductor 5, terminating in spring-jack $d^2$, and the local circuit is completed through the lamp-signal $v'$. It will be noted, however, that the line-circuit 10 11 of this line includes only the signal-bell $c^2$ at station B, the telephone-receiver being still on the switch-hook, so that relay $i$ of that line is not excited and the circuit through its individual signal is not complete. Hence the signal $v'$ receives its full normal current and is illuminated. If the circuit were closed through the telephone at the substation, the branch circuit 3 through the individual lamp-signal would be closed and lamp $v'$ would of course not be illuminated. It may be noted here also that if a connection already existed with the same line—as, for example, if a plug were inserted in spring-jack $d^3$ at section $e$ of the switchboard—a branch 9 through a clearing-out signal would be already connected to conductor 5, terminating in the spring-jack $d^3$, so that when the operator inserted plug $o'$ into jack $d^2$ the necessary condition for preventing the illumination of the lamps would be fulfilled—that is, two branches, including lamp-signals, would be placed in parallel connection. Thus the lamp-signal $v'$ would remain unlighted in either of two events—namely, if the subscriber at substation B had already removed his telephone from its switch-hook or if a connection already existed with the line at another section of the switchboard—whether the substation apparatus were in use or not. The illumination of the signal-lamp $v'$ upon the insertion of plug $o'$ into jack $d^2$ thus constitutes an automatic test-signal and signifies to the operator that the line is not in use. The line tests "busy" to operators desiring to make connection with it from the moment the subscriber removes his telephone from its switch-hook, while the required connection exists with the line and until the connecting-plug is finally withdrawn from the spring-jack. Assuming that the operator finds the line to station B free, she manipulates the calling-key $r$, and thus transmits to station B a signaling-current, which rings the bell $c^2$. When the subscriber at that station in response to this signal removes his telephone from its switch-hook, the signal $v'$ is extinguished. The operator is thus assured that the calling subscriber is in communication with his correspondent at station B without the necessity of making any oral inquiry. When either subscriber, as subscriber at station A, replaces his telephone upon its switch-hook, the line-relay in the corresponding line releases its armature, and thus interrupts the branch 3 through the individual signal. The full current through conductor 4 is now diverted through conductors 5 and 8 and the clearing-out signal $v$ is illuminated. In practice the operator does not disturb the connection until both clearing-out signals $v$ and $v'$ have become thus illuminated, which indicates that the subscribers have completed their conversation and both have replaced their telephones. She then removes the connecting-plugs from the spring-jacks of the united lines.

It is obvious that numerous other arrangements of the signal-lamps might be made by which they could be brought into parallel circuit with each other during connection with the line and by which one or the other should be caused to give a signal.

I claim as new—

1. In a signaling system the combination with two signal-lamps in parallel branches of a local circuit including a source of current, of an electromagnetic switch included in one of said branches, means for opening and closing the other branch, and a resistance-coil in the circuit to which said multiple branches are connected, said resistance-coil being of high resistance relatively to the joint resistance of said lamps, whereby it is adapted to check the flow of current to prevent either of said lamps from lighting when both parallel branches are closed, substantially as and for the purpose specified.

2. The combination with an electric circuit divided into two parallel branches, including a source of current and a resistance-coil, each branch including a signal-lamp, of a telephone-line with which the lamp in one branch is associated, means for making connection with the line, switch-contacts closed in making such connection adapted to complete the other branch, and other switch-contacts controlled from the substation of the line adapted to close said first-mentioned branch, substantially as described.

3. The combination with a telephone-line having a switch controlled automatically in the use of the telephone at the substation and a connection-socket, of a signal-lamp associated with the line, a connecting-plug and a signal-lamp associated therewith, a circuit including a source of current of such resistance as to limit the current in the circuit, divided into two parallel branches, in each of which one of the signal-lamps is included, the circuit through said first-mentioned signal-lamp being controlled by said automatic switch, and the circuit through said last-mentioned lamp being controlled by registering switch-contacts in the spring-jack and plug, substantially as described.

4. The combination with a line-relay in a telephone-line, responding to currents in the line, of a local circuit, two signal-lamps in parallel branches of the local circuit, one of the branches including the contact-pieces of the line-relay, and means for interrupting the other branch, substantially as described.

5. The combination with a telephone-line, of a relay responding to currents in the line, a local circuit including a signal-lamp associated with a spring-jack of the line, controlled by the relay, a clearing-out-signal lamp, and means for connecting the clearing-out-signal lamp in a shunt about that portion of the local circuit which includes the relay and the line-signal lamp, substantially as described.

6. The combination with a telephone-line, of a relay responding to currents in the line, a local circuit including a source of current, a resistance-coil, and a line-signal lamp, controlled by the relay, the line-signal being associated with a spring-jack of the line, a connecting-plug for use with the spring-jack, a clearing-out-signal lamp associated with the connecting-plug, and switch-contacts adapted to close a shunt-circuit through the clearing-out-signal lamp about the line-signal lamp and the contact-points of the relay when the plug is inserted into the spring-jack, substantially as described.

7. The combination with a telephone-line provided with a switch at the substation for closing the line-circuit while the telephone is in use, of a relay and a source of current in the line at the central station, a spring-jack connected with the line, a line-signal lamp associated with the spring-jack, a local circuit controlled by the relay including the line-signal lamp, a branch from one terminal of the signal-lamp to an insulated contact-piece in the spring-jack, a plug for making connection with the line, a conductor terminating in a contact-piece in the plug adapted to register with the said insulated contact-piece in the spring-jack, forming the terminal of a conductor including a clearing-out-signal lamp and connected with the remaining terminal of the line-signal lamp, substantially as described.

8. In combination, two telephone-lines, each terminating in a spring-jack and each including a relay and a source of current adapted to respond to current in the line during the use of the substation instruments, a connecting-plug in each spring-jack, a device in each plug-circuit for permitting the transmission of telephonic current therein but preventing the passage of continuous current from one plug to the other, a line-signal associated with the spring-jack of each line, and a clearing-out signal associated with each connecting-plug, the line-signal of one line and the corresponding clearing-out signal being in parallel branches of a local circuit, the conductor including each line-signal being controlled by the corresponding line-relay, whereby clearing-out signals are substituted for the line-signals and currents in the different lines are caused to give independent signals.

9. In a testing device for multiple switchboards, a series of contact-pieces in the different spring-jacks of a line, electrically connected together, a source of determinate current connected with these contact-pieces, a shunt about the source of current adapted to be completed when connection is made with the line, a testing instrument adapted to respond when traversed by the full current of said source, and means for applying the testing instrument to the test-contact of any spring-jack to bring it into shunt of the source of current, whereby the presence of a shunt about the said source may be determined.

10. In a testing device for multiple switchboards, a series of test-contacts in the different spring-jacks of a line, electrically connected together, a battery permanently connected through a resistance-coil with the said test-contacts, a conductor leading from the free pole of the said battery, means for connecting the said conductor to the test-contacts when connection is made with the line, and a testing device adapted to respond to the full current through said resistance-coil in a similar conductor adapted to be applied to any test-contact, whereby the presence of the shunt may be detected.

11. In a testing device for multiple switchboards, the combination with test-contacts in the different spring-jacks of a line, of a source of current permanently connected through a resistance-coil with the test-contacts, a connecting-plug and a contact-piece therein adapted to register with said test-contacts and forming the terminal of a conductor connected with the free pole of said battery, another connecting-plug and a similar contact-piece therein, a signal-lamp in the conductor terminating in the said contact-piece, said lamp being adapted to be illuminated by the full current through the resistance-coil, whereby the presence of an existing connection is automatically indicated when the last-mentioned connecting-plug is inserted into the spring-jack.

12. In a testing device for multiple switchboards, the combination with the spring-jacks, of a series of test-contacts therein, a source of current adapted to give a current of determinate volume permanently connected with the test-contacts, a shunt-circuit about said source of current, and a relay responding to currents in the telephone-line controlling the shunt, other shunt-circuits terminating in the different connecting-plugs so as to be applied when connection is made with any spring-jack, a testing instrument adapted to respond only to the full current from said source, and a conductor including the testing instrument connected with the free pole of the battery and adapted to be applied to any test-contact, whereby the presence of an existing connection and currents in the telephone-line both cause the line to test busy.

13. The combination with a telephone-line, of a relay and a source of current in the line at the central office, a line-signal lamp and a local-battery circuit containing the signal-lamp controlled by said relay, spring-jacks for the line and a plug and plug-circuit for making connection therewith, and a local shunt-circuit of said signal-lamp closed in registering contacts of the spring-jack and plug, as described.

14. In combination with a telephone-line and spring-jacks thereof in a switchboard, a source of current and a relay connected with the line and a secondary signal in a local-battery circuit controlled by the relay, a resistance in said local circuit and a branch or shunt circuit in multiple with said secondary signal, excluding said resistance, closed in registering contacts of the jack and plug, as described.

15. The combination with a telephone-line and a switch controlling the circuit thereof at the substation, of a source of current and a relay permanently connected with the line at the central office, a secondary line-signal in a local circuit controlled by said relay, spring-jacks of the line and a plug and plug-circuit for making connection with the line by means of a spring-jack, a supervisory signal associated with the plug-circuit, and a circuit controlled by said relay including said supervisory signal closed in registering contacts of the spring-jack and plug, as described.

16. The combination with a telephone-line, of a source of current and a signal-controlling relay permanently connected with the line and a switch at the substation of the line controlling the line-circuit, a secondary line-signal and a local circuit thereof controlled by the relay, spring-jacks of the line and a plug and plug-circuit for making connection therewith, a shunt-circuit of said secondary line-signal, closed in registering contacts of the spring-jack and the plug, a clearing-out or supervisory signal associated with the plug-circuit, said supervisory signal being also controlled by said relay during connection with the line, as described.

17. In combination, two telephone-lines, each having at its substation a switch controlling the circuit of the line, a source of current and a relay for each line at the central office permanently connected with its line, a link conductor uniting the lines into a through telephonic circuit, an inductive appliance in said link conductor adapted to convey telephone-currents while opposing the passage of continuous currents, supervisory signals associated with said link conductors, and circuits, one for each line, controlled by said relays of the lines containing said supervisory signals, substantially as described.

In witness whereof I hereunto subscribe my name this 19th day of January, A. D. 1895.

CHARLES E. SCRIBNER.

Witnesses:
  ELLA EDLER,
  LUCILE RUSSELL.